(12) United States Patent
Miette

(10) Patent No.: US 9,199,282 B2
(45) Date of Patent: Dec. 1, 2015

(54) METHOD OF TRACKING MAILPIECES FOR MEASURING JOURNEY TIMES THROUGH A MULTI-NETWORK POSTAL SORTING SYSTEM

(71) Applicant: Solystic, Gentilly (FR)

(72) Inventor: Emmanuel Miette, Saint Gratien (FR)

(73) Assignee: SOLYSTIC, Gentilly Cedex (FR)

( * ) Notice: Subject to any disclaimer, the term of this patent is extended or adjusted under 35 U.S.C. 154(b) by 402 days.

(21) Appl. No.: 13/822,026

(22) PCT Filed: Dec. 20, 2012

(86) PCT No.: PCT/FR2012/053031
§ 371 (c)(1),
(2) Date: Mar. 11, 2013

(87) PCT Pub. No.: WO2013/132164
PCT Pub. Date: Sep. 12, 2013

(65) Prior Publication Data
US 2015/0108048 A1    Apr. 23, 2015

(30) Foreign Application Priority Data
Mar. 9, 2012   (FR) ...................................... 12 52141

(51) Int. Cl.
*B07C 3/00* (2006.01)
*B07C 3/14* (2006.01)
*G06K 9/62* (2006.01)

(52) U.S. Cl.
CPC ... *B07C 3/14* (2013.01); *B07C 3/00* (2013.01); *G06K 9/6215* (2013.01)

(58) Field of Classification Search
CPC .............. B07C 1/00; B07C 3/00; B07C 3/02; B07C 3/14; B07C 5/3412; B07C 5/342; G06Q 50/32; G07K 7/10; G06K 7/10; G06K 9/6215

USPC .......................................... 209/577, 587, 584
See application file for complete search history.

(56) References Cited

U.S. PATENT DOCUMENTS

| 7,991,704 B2 | 8/2011 | Ryan |
| 2002/0172399 A1 | 11/2002 | Poulin |
| 2010/0150398 A1 | 6/2010 | Lee et al. |
| 2010/0312715 A1* | 12/2010 | Esque et al. .................. 705/330 |
| 2010/0332406 A1 | 12/2010 | Kinnemann |
| 2011/0215035 A1* | 9/2011 | Caillon et al. ................. 209/552 |
| 2013/0173050 A1* | 7/2013 | Tresse et al. .................. 700/223 |
| 2014/0072167 A1* | 3/2014 | Miette ........................... 382/101 |

FOREIGN PATENT DOCUMENTS

EP     1519796     4/2005

* cited by examiner

*Primary Examiner* — David H Bollinger
(74) *Attorney, Agent, or Firm* — Ware, Fressola, Maguire & Barber LLP

(57) ABSTRACT

A method of tracking mail in a postal sorting system comprising first and second networks of sorting machines with first and second unique identification protocols for uniquely identifying the mailpieces, the first and second networks producing first and second dated tracking data as a mailpiece is passing through the sorting machines, this first and second dated data being associated with first and second unique mailpiece identifiers generated using the first and second protocols, said dated data associated with said first and second unique mailpiece identifiers is retrieved in a data-processing unit for the purpose of measuring a time characteristic of the journey of the mailpiece through the first and second networks, and a match is established between the unique identifiers via digital images of the mailpiece.

13 Claims, 4 Drawing Sheets

METHOD OF TRACKING MAILPIECES FOR MEASURING JOURNEY TIMES THROUGH A MULTI-NETWORK POSTAL SORTING SYSTEM

CROSS REFERENCE TO RELATED APPLICATIONS

This application is the U.S. National Stage of International Application number PCT/FR2012/053031 filed on Dec. 20, 2012 which application claims priority under 35 USC §119 to French Patent Application number 1252141 filed on Mar. 9, 2012, which applications are hereby incorporated by reference in their entirety.

TECHNICAL FIELD

The field of the invention is the field of automatically sorting mailpieces, it being possible for the mailpieces to be letters, magazines or newspapers wrapped in plastic or in paper, and in general large-format or small-format flat articles, or indeed parcels.

The invention relates more particularly to a method of tracking mail in a postal sorting system, with a view, in particular, to measuring the journey time of the mail through the sorting system.

PRIOR ART

Tracking mail makes it possible to measure the quality of service provided by the postal operators. Mailers and postal operators alike need to know the real transit time of mail and to track it between it being handed over to the departure or "outward" post office and it being delivered to the recipient by the mail carrier. The transit time depends on the time taken for automatically processing the mail in the various sorting machines through which it passes. When the mail is international mail, there is also the transfer of the mail from one national postal operator to another national postal operator. There also exists a need for postal operators to measure their quality of service for "international" mail. There also exist needs for measuring the transit time for national mail that actually goes via various independent postal operators who have their own sorting systems.

One known technique for tracking and measuring journey time of mail consists in using a test letter, i.e. a special letter equipped with a radiofrequency identification (RFID) tag or chip that bears a unique identifier. Gates are placed at key points of passage through which the test letter passes in the network of sorting machines, e.g. at the entrances to or at the exits from sorting rooms. Each gate detects passage of the test letter, which is usually in a handling tray, and feeds back the tracking data to a remote data server. That data typically indicates place of detection and date and time of detection. The place of detection may be a gate identifier or the like. On the basis of a history of tracking data, it is possible to estimate the journey time of the test letter from the time at which it is posted to the time at which it is delivered to the recipient. That technique is complicated and costly to implement because it requires additional hardware means in the sorting facilities. Furthermore, it does not make it possible to take measurements on real mail and, in reality, few test letters travel every day through the sorting facilities, and the measurements are therefore not very representative of the real situation.

Patent Document U.S. Pat. No. 7,991,704 describes a method of tracking mail that is designed for multiple postal network tracking, i.e. for tracking the mail through a plurality of different networks of sorting machines belonging to various postal operators. That method is used for tracking the transit times of "international" mail. In that context, each network of sorting machines has its own unique identification protocol for uniquely identifying the mailpieces, and the various protocols are generally very different from one another and mutually incompatible. In order to mitigate that situation, that known method makes provision to place on a specific letter the various mailpiece identification codes generated using the various protocols of the networks of sorting machines in question. Those various identification codes are placed on the letter before it is fed into the networks of sorting machines. While the letter is passing through a certain network of sorting machines, it thus bears an identification code that is readable and recognizable by the machines in the network, and tracking data can thus be fed back to a data server in association with that identification code. Unfortunately, that technology suffers from the drawback of having a letter that is cluttered with identification codes, which is detrimental to automatic optical character recognition (OCR) processing for recognizing the delivery address. That letter might thus pass through the various sorting machines under poor conditions and thus the data fed back for the letter might not necessarily be representative for providing a measurement of quality. In addition, that technique is constraining on the mailer of the specific letter because that mailer needs to know all of the unique mailpiece identification codes used by the postal operators who are going to sort and carry the specific letter, and said mailer needs to print those codes on the letter. Yet another drawback with that known technique for tracking mail is that the specific letter bearing a plurality of identification codes is readily identifiable by the machine operators, who might, intentionally or otherwise, apply specific sorting processing to it that would then distort the measurement of the journey time.

SUMMARY OF THE INVENTION

An object of the invention is to provide a method of tracking mail that does not suffer from all of those drawbacks.

The basic idea of the invention is to use real mail to trace the history of the passage of the mail through a network of sorting machines. Then, if a real mailpiece travels through two networks of sorting machines, the idea is to use the image of that real mailpiece to establish a link between a mailpiece identifier generated for said mailpiece by a first network and another mailpiece identifier generated for the same mailpiece but by the other network. More particularly, this idea consists in feeding back an image of the mailpiece that is associated with the first identifier when the mailpiece is in the first network, and another image of the mailpiece that is associated with the second identifier when the mailpiece is in the second network, and in establishing a link between the two identifiers by detecting a match between the two images of the same mailpiece.

More particularly, the invention provides a method of tracking mail in a postal sorting system comprising a first network of sorting machines with a first unique identification protocol for uniquely identifying the mailpieces in the machines, and a second network of sorting machines with a second unique identification protocol for uniquely identifying the mailpieces in the machines, in which method the first network produces first dated tracking data as a certain mailpiece is passing through the sorting machines of the first network, this first dated data being associated with a first unique mailpiece identifier generated using the first protocol, and the second network produces second dated tracking data as said certain mailpiece is passing through the sorting machines of the second network, this second dated data being associated with a second unique mailpiece identifier generated using the second protocol, said method being characterized in that, in a data-processing unit, said dated data associated with said first and second unique mailpiece identifiers is retrieved for the purposes of measuring a time characteristic of the journey of said certain mailpiece through the first and second networks of the system, and in that, in the data-processing unit, a match is established between said first and second unique mailpiece identifiers via digital images of said certain mailpiece.

This method is designed to be implemented by a service provider. The data-processing unit may be a data and image server of the service provider that is connected via a communications network to the networks of sorting machines of the postal operators. The communications network may be the Internet or some similar network.

With the method of the invention, each postal operator can have its own data server for storing mailpiece tracking data, and the service provider's data and image server is then connected to the postal operators' tracking data severs so as to retrieve the tracking data from them. With the method of the invention, the service provider may also be another postal operator. It is also possible to use an identifier of the "tracked letter" type and/or of the "ID-tag" type as the unique mailpiece identifier in one of the networks into which a tracked mailpiece enters first. The method of the invention is thus compatible with a unique identification protocol for uniquely identifying mailpieces without printing the identification code on the mailpieces, e.g. mailpiece identification by image signature. Such a unique mailpiece identification mechanism without printing is described in Patent EP 1 519 796 and is based on a digital image signature having two components, one of the components being representative of the physical characteristics of the image (size, pixels, etc.), and the other component being at least one textual description of the recipient address block appearing in the image.

According to a feature of the method of the invention, in the data processing unit, a first image of the mailpiece, which image is associated with the first unique mailpiece identifier, is retrieved from the first network, a second image of said mailpiece, which image is associated with the second unique mailpiece identifier, is retrieved from the second network, it is detected whether the first image graphically matches the second image so as to establish said match between said first and second unique mailpiece identifiers, and, on the basis of this matching, said first dated tracking data produced by the first network is consolidated in a memory with the second dated tracking data produced by the second network.

According to another feature of the method of the invention, said first image associated with said certain mailpiece is retrieved during the last sorting pass of said mailpiece through the first network, and said second image associated with said certain mailpiece is retrieved during the first sorting pass of said certain mailpiece through the second network.

According to yet other features of the method of the invention:

a first image signature and a second image signature are derived respectively from the two images of the mailpiece, each image signature comprising a component representative of physical characteristics of the image and a second component that is a textual description of the recipient address block, and the components of the first image signature are compared with the components of the second image signature in order to detect a graphical match between the two images of the mailpiece;

each of the first and second images of said certain mailpiece is retrieved associated with a receiver network identifier for identifying the network receiving the mailpiece; and the receiver network identifier is associated in a sorting plan with a sorting outlet of a sorting machine of the first network.

BRIEF DESCRIPTION OF THE DRAWINGS

The method of the invention can be better understood on reading an implementation described in detail below and shown in the figures, in which.

DESCRIPTION OF AN IMPLEMENTATION

Figure 1:
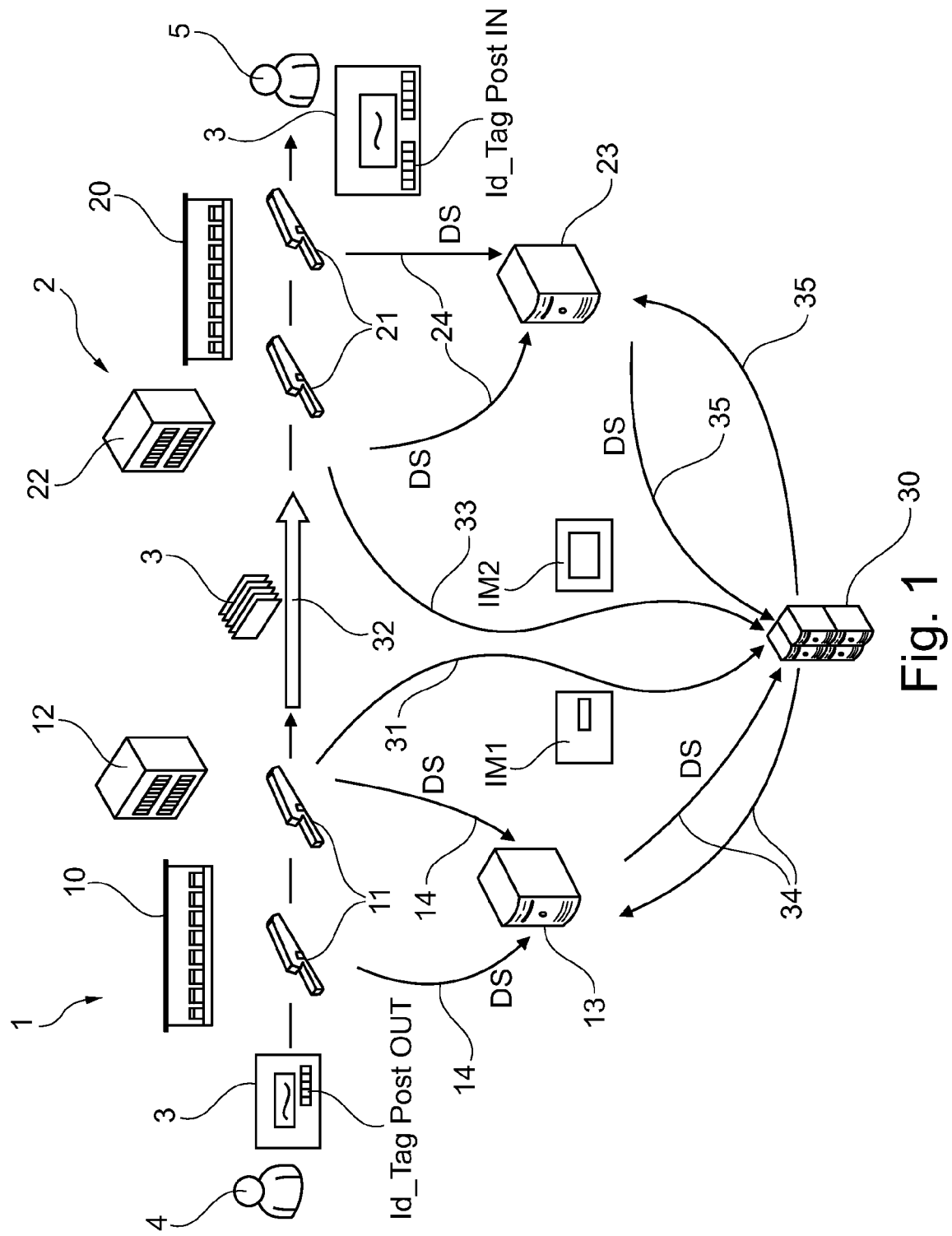
FIG. 1 is a highly diagrammatic view of the method of the invention in a postal sorting system with two networks of postal sorting machines.

FIG. 1 shows a postal sorting system which, in this example, is made up of two networks of postal sorting machines that belong to two postal operators, e.g. two national postal operators 1 and 2, each of which has its own sorting centers, respectively 10 and 20, with respective sorting machines 11 and 21, and its own unique mailpiece identification protocol for uniquely identifying mailpieces in the sorting machines 11, 21, e.g. in the form of bar codes placed on the mailpieces.

The example considers mailpieces 3 mailed by a mailer (or by a plurality of mailers) at one (or more) post offices 1 and that pass from one postal operator to another and thus from an outward office of exchange 12 of the postal operator 1 to an inward office of exchange 22 of the postal operator 2 so as to be delivered to one or more recipients 5.

The tracking method of the invention uses real mailpieces 3. These real mailpieces 3 are tracked throughout their journeys through the sorting machines 11, 21 of the two postal operators 1 and 2, by means of the unique mailpiece identification protocols implemented in the postal operators 1 and 2 respectively.

Implementation of the method of the invention is described below with a single real mailpiece 3. A real mailpiece 3 is thus mailed in a mailbox of postal operator 1 and is sorted in the sorting machines 11 of postal operator 1. During the first pass of the mailpiece 3 through a first sorting machine 11, a unique mailpiece identifier is generated in the machine using the identification protocol of postal operator 1 and is, for example, placed on a face of the mailpiece in the form of a first bar code "Id_Tag Post OUT" that is readable by the sorting machines 11 as is well known. The delivery address of the mailpiece 3 is recognized by OCR on the basis of the image of the mailpiece 3 as is known. In the network 1 of sorting machines 11, the mailpiece 3 can undergo a plurality of sorting passes through the same sorting machine 11 or through a plurality of different sorting machines 11.

The parameters of the sorting machines 11 are set so as to track the mailpiece 3, i.e. so as to feed back dated tracking data DS (of the machine location type and of the date & time data type) to a mailpiece tracking system represented by the tracking data server 13, which is specific to postal operator 1 in this example. It is thus considered that each time the mailpiece 3 as provided with its unique mailpiece identifier "Id_Tag Post OUT" is detected at the inlet of a sorting machine such as 11 (e.g. by a bar code reader) dated tracking data DS specific to said mailpiece 3 is sent by the sorting machine 11 in question to the tracking data server 13 and, as the mailpiece 3 passes through the various sorting machines 11, a succession of such dated tracking data DS is thus produced and transmitted to the tracking data server 13.

The successive transmissions of said dated tracking data DS from the postal sorting machines 11 of the postal operator 1 are indicated by arrows 14 in FIG. 1.

The dated tracking data DS received by the tracking system 13 is archived in the form of a history, each item of dated tracking data DS transmitted by a sorting machine such as 11 typically being constituted, for example, by a triplet (Id_Tag Post OUT—identifier of sorting machine 11—date and time of passage through sorting machine 11).

When the mailpiece 3 arrives at the end of the sorting cycle through the first network 1 of postal sorting machines 11, said mailpiece is detected in a last sorting machine 11 of the sorting cycle that is installed in the office of exchange 12, and said sorting machine 11 transmits last dated tracking data DS to the tracking data server 13 as indicated above.

In accordance with the invention, a digital image IM1 of said mailpiece 3, which image includes the recipient address block, is also transmitted in association with the unique mailpiece identifier Id_Tag Post OUT of the mailpiece 3 from the office of exchange 12 (the last sorting machine 11 at the end of the sorting cycle in the network 1) to a data and image server 30 that acts as a data processing unit and temporarily archives this information in a memory.

The image IM1 of the mailpiece 3 being transmitted to the data and image server 30 is indicated by arrow 31. The data and image server 30 can be considered as being a mailpiece tracking integrator external to the postal networks 1 and 2. It should be understood that it is a data processing and storage unit in the form of a computer or of a network of computers.

These mailpiece tracking operations may be generalized over an entire set of real mailpieces 3 transiting (as indicated by arrow 32) between the postal network 1 and the postal network 2, in particular in the context of a measurement campaign.

The mailpiece 3 now finds itself in a sorting machine 21 of the office of exchange 22 of the postal operator 2. In this sorting machine 21, a digital image of the mailpiece 3 is formed once again, this image including the delivery address block of the mailpiece, and a second unique mailpiece identifier for the mailpiece 3 is generated in the machine using the unique identification protocol for uniquely identifying the mailpieces 3 that is specific to the network 2, and said second unique mailpiece identifier is, for example, placed on a face of the mailpiece 3 in the form of a second bar code "Id_Tag Post IN" that is readable by the sorting machines 21 as is well known.

In accordance with the invention, the sorting machine 21 transmits this digital image IM2 of the mailpiece 3 associated with the second unique mailpiece identifier "Id_Tag Post IN" to the data and image server 30, which stores this information temporarily in a memory. Images IM2 being transmitted to the data and image server 30 is indicated in FIG. 1 by arrow 33.

In parallel with this transmission of images 33, the sorting machine 21 in the office of exchange 22 also transmits dated tracking data DS, e.g. to a tracking data server 23 specific to the postal network 2 as indicated by arrow 24. This dated tracking data DS can also be in the form of a triplet (Id_Tag Post IN—identifier of sorting machine 21—date and time of passage through the sorting machine 21).

The mailpiece 3 then continues on its journey through the sorting machines 21 of the postal network 2 until a final sorting stage for delivery by a mail carrier, and it can be understood that the dated tracking data DS produced successively for this mailpiece 3 is transmitted successively to the tracking data server 23 as the mailpiece 3 passes through the various sorting machines 21 as indicated by the arrows 24.

In accordance with the invention, in the data and image server 30, at any given time, e.g. when the data and image server 30 receives the mailpiece image IM2 coming from a center of exchange 22 that corresponds to a mailpiece 3 entering said center of exchange 22 and coming from another center of exchange 12, the mailpiece image IM2 coming from the center of exchange 22 is compared with the mailpiece images IM1 received from the center of exchange 12 for various mailpieces in such a manner as to detect a graphical match between the image IM1 of the mailpiece 3 taken in the postal network 1 and the image IM2 of the same mailpiece 3 taken in the postal network 2 in such a manner as to associate the first identification code "Id_Tag Post OUT" with the second identification code "Id_Tag Post IN", which codes are assigned to the mailpiece 3 respectively by one and the other of the postal networks 1, 2.

In response to such a match being detected, the data and image server 30 is suitable for retrieving (arrows 34) first archives of dated tracking data DS associated with the mailpiece identifier "Id_Tag Post OUT" from the tracking data server 13 of the postal network 1, and also for retrieving (arrows 35) second archives of dated tracking data DS associated with the mailpiece identifier "Id_Tag Post IN" and concerning the same mailpiece from the tracking data server 23 of the postal network 2.

Thus, in the data and image server 30, a full history can be established of the dated tracking data DS for the mailpiece 3 throughout its journey through the postal networks 1 and the journey time of the mailpiece 3 through the sorting machines 11 and 21 can thus be determined accurately.

It should be noted that this tracking method may be extended to a set of mailpieces 3, either over a given period corresponding to a measurement campaign, or, more systematically, to all mail transiting from one postal network 1 to another postal network 2.

It can be understood that the method of the invention avoids the use of specific test letters, which do not make it possible to achieve accurate measurements, and it can be implemented rapidly in existing postal networks without modifying the systems for identifying mailpieces in the sorting facilities.

Figure 2:
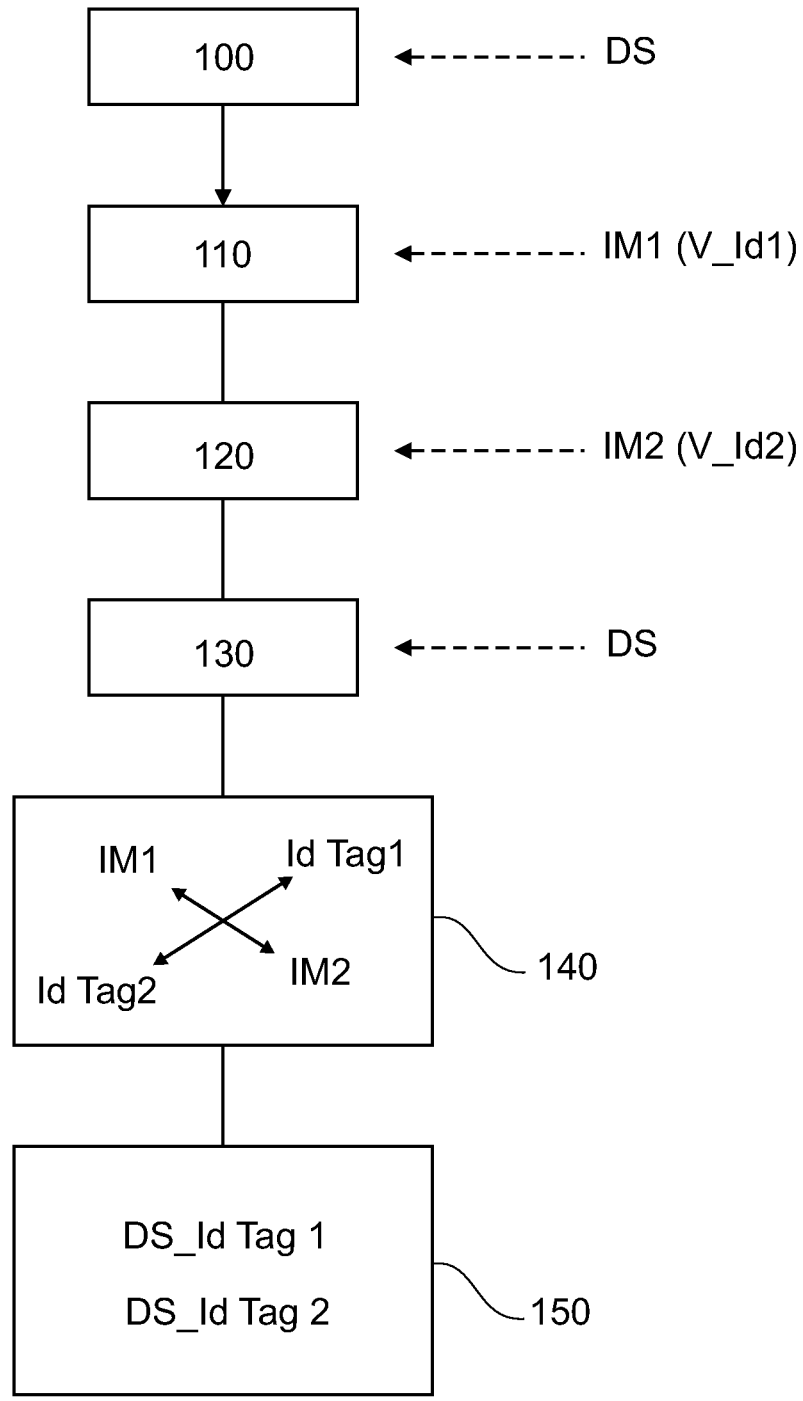
FIG. 2 shows more particularly how two images of a mailpiece are matched so as to consolidate the tracking data associated with said mailpiece.

FIG. 2 shows how the images IM1, IM2 of a mailpiece 3 are matched so as to consolidate the dated tracking data DS associated with said mailpiece 3.

At 100, the tracking data server 13 receives a succession of items of dated tracking data DS each containing a first unique mailpiece identifier Id Tag 1. The tracking data server 13 can receive and store dated tracking data DS for a large number of mailpieces 3 that enter the network 1.

At 110, the data and image server 30 receives and records a succession of digital images IM1 each associated with a unique mailpiece identifier Id Tag 1 and that correspond to so many different mailpieces 3 that arrive in the center of exchange 12.

At 120, the data and image server 30 receives and records a succession of digital images IM2 each associated with a unique mailpiece identifier Id Tag 2 and that correspond to so many different mailpieces 3 that arrive in the center of exchange 22. In the example, the identifiers Id Tag 2 are generated using a protocol different from the protocol used for generating the identifiers Id Tag 1.

In the meantime, at 130, the tracking data server 23 receives a succession of items of dated tracking data DS each containing a first unique mailpiece identifier Id Tag 2. The tracking data server 23 can also receive and store dated tracking data DS for a large number of mailpieces 3 that enter the network 2.

At 140, on detecting an image IM2 coming from the tracking data server 23, the data and image server 30 searches the images IM1 recorded in the memory in order to detect any graphical match between two images IM1, IM2, so as to establish a match between the identifier Id Tag 1 associated with the image IM1, and the identifier Id Tag 2 associated with the image IM2. This search through the images IM1 can be conducted each time a new image IM2 is detected, or indeed cyclically or on request, depending on circumstances, without going beyond the invention.

In order to detect a graphical match between an image IM1 and an image IM2 of the same mailpiece 3, it is possible to use image signatures, i.e. first and second image signatures V-Id1, V-Id2 are respectively derived from two images IM1, IM2 of the same mailpiece 3, each image signature V-Id1, V-Id2 comprising a component representative of physical characteristics of the image IM1, IM2 and a second component that is a textual description of the recipient address block, and the components of the first image signature V-Id1 are compared with the components of the second image signature V-Id2 so as to detect a graphical match between the two images IM1, IM2 of the mailpiece 3.

Such image signatures V-Id1, V-Id2 may also be produced by the tracking data servers 13 and 23 or indeed by the sorting machines 11, 21 and be transmitted to the data and image server 30 as shown in FIG. 2 instead of the images IM1, IM2 of the mailpieces 3, without going beyond the ambit of the invention.

On the basis of the matching of the mailpiece identifiers Id Tag 1 and Id Tag 2, the data and image server 30 may, at 150 in FIG. 2, consolidate the dated tracking data DS associated with the mailpiece identifier Id Tag 1 with the dated tracking data DS associated with the mailpiece identifier Id Tag 2 so as to construct a full history of the journey of a mailpiece 3 through the two postal networks 1 and 2.

It can be understood that tracking the real mail using the method of the invention requires a large quantity of images IM1, IM2 to be stored and to be searched in the data and image server 30. In order to accelerate the matching of the images IM1, IM2 produced by the postal network 1 and the images produced by the postal network 2, it is possible to provide partitioning in the data and image server 30 for partitioning the images IM1 on the basis of a geographical criterion of place of delivery of the mailpieces 3, e.g. on the basis of the country of the delivery address of each mailpiece 3. In this way, on receiving an image IM2 produced by a national postal operator, the data and image server 30 can limit its search of images IM1 and IM2 to detecting matches only between images IM1 and IM2 associated with the country corresponding to the country of said national postal operator.

Figure 3:
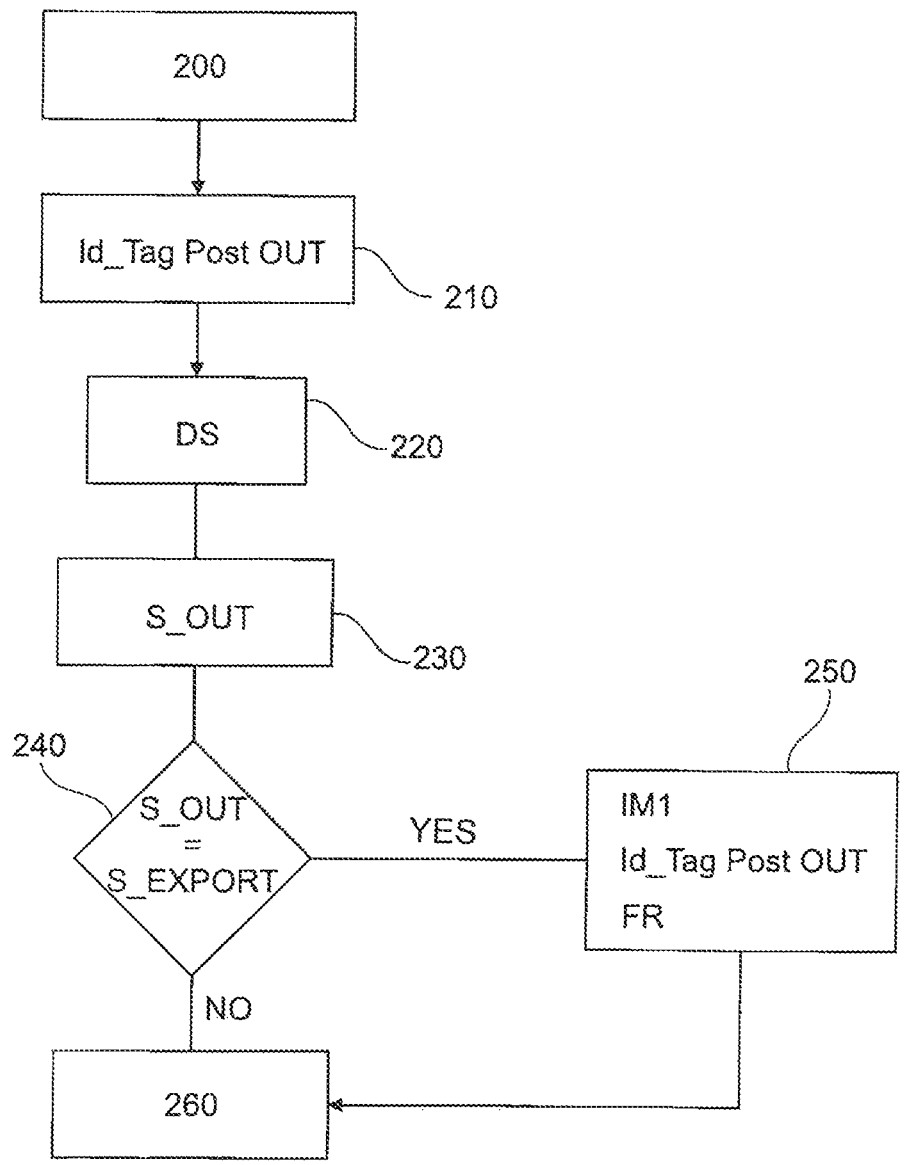
FIG. 3 shows the method of tracking a mailpiece through the first network of sorting machines.

FIG. 3 diagrammatically shows the sorting process for sorting the mailpieces 3 with transmission of images IM1 being triggered. In particular, a mailpiece 3 is unstacked at 200 from the last sorting machine 11. This mailpiece 3 is already provided with a unique mailpiece identification code Id_Tag Post OUT generated using the protocol of the network of the postal operator 1, which unique mailpiece identification code Id_Tag Post OUT is stored in a database in correspondence with the sorting data of the mailpiece 3. In the sorting machine 11, the unique mailpiece identification code Id_Tag Post OUT of this mailpiece 3 is thus recognized automatically at 210, e.g. by a bar code reader, and the sorting data of said mailpiece 3 is retrieved automatically in the database by the sorting machine 11. At this stage of the sorting process, dated tracking data DS is sent to the tracking data server 23 in step 220. The sorting data is crosschecked against the sorting plan in the sorting machine 11 so as to determine at 230 the sorting outlet S-OUT of the sorting machine 11 towards which the mailpiece 3 is to be directed. In accordance with the invention, in the sorting plan, the sorting outlets that are to receive "export mail", i.e. mail in the last sorting pass that is to pass through an outward office of exchange such as 12, data S-EXPORT indicating that this sorting outlet is an outlet for "export mail on its last sorting pass". After step 230, in the sorting process, it is detected at 240 whether the sorting outlet determined at 210 for a current mailpiece 3 is a sorting outlet for "export mail on its last sorting pass" and, if it is, the image IM1 of the current mailpiece 3 is transmitted at 250 to the data and image server 30 in association with the unique mailpiece identification code Id_Tag Post OUT associated with the current mailpiece 3 and also geographical partitioning information, e.g. FR, as indicated in FIG. 3. Then, the process continues with the sorting at 260 of the current mailpiece 3 in the sorting outlet S-OUT. If the result of step 240 is "no", no image IM1 is sent to the data and image server 30, and the process continues at step 260.

Figure 4:
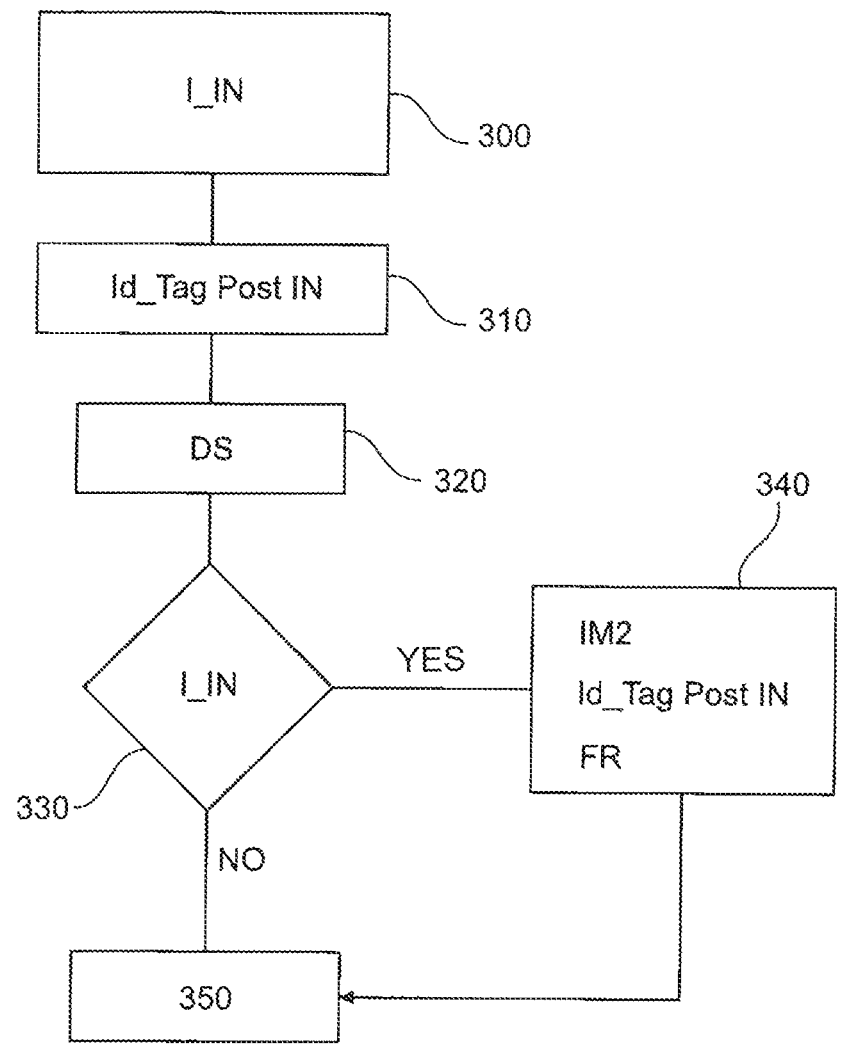
FIG. 4 shows the method of tracking a mailpiece through the second network of sorting machines.

FIG. 4 diagrammatically shows the sorting process for sorting the mailpieces 3 with transmission of images IM2 being triggered. The mailpiece 3 is unstacked in the sorting machine 21 and in step 300. The unique mailpiece identification code Id_Tag Post OUT of the mailpiece 3 is normally not recognizable by the sorting machine 21. Then, at 310, a digital image IM2 of the mailpiece 3 is formed in the sorting machine 21 by a camera, a unique mailpiece identifier Id_Tag Post IN is generated and an OCR postal address recognition process is applied to the image IM2 for the purposes of recognizing the delivery address on the mailpiece 3 and of producing sorting data that is associated in a database with the identifier Id_Tag Post IN. The sorting data is crosschecked against the sorting plan in the sorting machine 21 so as to determine a corresponding sorting outlet into which the current mailpiece 3 is to be sorted. At 320, dated tracking data DS is transmitted to the tracking data server 23 as indicated above. In accordance with invention, in the sorting machine 21, it is determined at 330 whether said current mailpiece 3 is an "import mailpiece on its first sorting pass", i.e. a mailpiece 3 coming from an inward office of exchange such as 22. In accordance with the invention, the mailpieces 3 coming from the office of exchange 22 are identified upstream from the unstacking at 300 as being "import mailpieces on their first sorting passes" by a machine control parameter being entered, e.g. by means of a codified separator that is recognizable by the sorting machine 21. More particularly, mailpieces 3 coming from the office of exchange 22 are gathered into a stack and loaded into the magazine of the sorting machine 21. This stack of mailpieces 3 is preceded by an unstackable separator designed to indicate a stack "of import mailpieces on their first sorting passes". This indication may also be achieved by a bar code I-IN placed on the separator and that is read in step 300.

At 330, during the passage of a current mailpiece 3, if the bar code I-IN has already been detected upstream by the sorting machine 21, the image IM2 of the current mailpiece 3 is transmitted at 340 with the unique mailpiece identification code Id_Tag Post IN associated with the current mailpiece 3 and also associated with a receiver network identifier, e.g. "FR" for identifying the receiver network, which, in this example, is the postal operator 2. This identifier is assumed to be known in the sorting machine 21, e.g. in the configuration parameters of said machine.

The process then continues at step 350 for sorting the current mailpiece 3 into the sorting outlets corresponding to the delivery addresses. If the result of step 330 is "no", the process continues at step 350.

The indication at 300 may also be achieved by a specific machine parameter being entered by the operator of the sorting machine 21 as is known.

The invention claimed is:

1. A method of tracking, in a postal sorting system having a first network of sorting machines and a second network of sorting machines, a mailpiece intended to be delivered, said method comprising the steps of:
generating a first unique mailpiece identifier and a first dated tracking data from said mailpiece when passing through the first network of sorting machines by a first unique identification protocol of said postal sorting system,
generating a second unique mailpiece identifier and a second dated tracking data from said mailpiece when passing through a second network of sorting machines by a second unique identification protocol of said postal sorting system,
associating in a data-processing unit said first unique mailpiece identifier and said first dated tracking data with a first image of said mailpiece when passing through the first network and associating in said data-processing unit said second unique mailpiece identifier and said second dated tracking data with a second image of said mailpiece when passing through the second network,
detecting in said data-processing unit a graphical matching between said first image and said second image of said mailpiece and in response thereto:
associating in said data-processing unit the first and second unique mailpiece identifiers of said mailpiece, and
retrieving in said data-processing unit said first dated tracking data and said second dated tracking data corresponding to said associated first and second unique mailpiece identifiers and based on said first dated tracking data and said second dated tracking data, establishing a time characteristic of the dated tracking data of said mailpiece throughout its journey through the first and second networks of said postal sorting system so as to determine said tracking of said mailpiece.

2. The method according to claim 1, comprising the step of consolidating in the data processing unit said first dated tracking data produced by the first network with the second dated tracking data produced by the second network.

3. The method according to claim 2, comprising the steps of retrieving during a last sorting pass of said mailpiece through the first network said first image associated with said certain mailpiece, and in retrieving said second image associated with said certain mailpiece during a first sorting pass of said certain mailpiece through the second network.

4. The method according to claim 3, comprising the steps of deriving a first image signature and a second image signature respectively from the two images of the mailpiece, each image signature comprising a component representative of physical characteristics of the image and a second component that is a textual description of a recipient address block of the mailpiece, and in comparing the components of the first image signature with the components of the second image signature in order to detect a graphical match between the two images of the mailpiece.

5. The method according to claim 4, comprising the step of retrieving each image of said certain mailpiece associated with a receiver network identifier for identifying the network receiving the mailpiece.

6. The method according to claim 5, comprising the step of associating the receiver network identifier in a sorting plan with a sorting outlet of a sorting machine of the first network.

7. The method according to claim 1, comprising the steps of deriving a first image signature and a second image signature respectively from the two images of the mailpiece, each image signature comprising a component representative of physical characteristics of the image and a second component that is a textual description of a recipient address block of the mailpiece, and in comparing the components of the first image signature with the components of the second image signature in order to detect a graphical match between the two images of the mailpiece.

8. The method according to claim 1, comprising the step of retrieving each image of said certain mailpiece associated with a receiver network identifier for identifying the network receiving the mailpiece.

9. The method according to claim 8, comprising the step of associating the receiver network identifier in a sorting plan with a sorting outlet of a sorting machine of the first network.

10. The method according to claim 1, comprising the steps of retrieving during a last sorting pass of said mailpiece through the first network said first image associated with said certain mailpiece, and in retrieving said second image associated with said certain mailpiece during a first sorting pass of said certain mailpiece through the second network.

11. The method according to claim 10, comprising the steps of deriving a first image signature and a second image signature respectively from the two images of the mailpiece, each image signature comprising a component representative of physical characteristics of the image and a second component that is a textual description of a recipient address block of the mailpiece, and in comparing the components of the first image signature with the components of the second image signature in order to detect a graphical match between the two images of the mailpiece.

12. The method according to claim 11, comprising the step of retrieving each image of said certain mailpiece associated with a receiver network identifier for identifying the network receiving the mailpiece.

13. The method according to claim 12, comprising the step of associating the receiver network identifier in a sorting plan with a sorting outlet of a sorting machine of the first network.

* * * * *